United States Patent
Rendlen

(10) Patent No.: US 10,958,812 B2
(45) Date of Patent: Mar. 23, 2021

(54) OPTICAL LENS SUPPORT

(71) Applicant: SHOPPERTRAK RCT CORPORATION, Chicago, IL (US)

(72) Inventor: Jeffrey R. Rendlen, Chicago, IL (US)

(73) Assignee: Shoppertrak RCT Corporation, Chicago, IL (US)

( * ) Notice: Subject to any disclaimer, the term of this patent is extended or adjusted under 35 U.S.C. 154(b) by 0 days.

(21) Appl. No.: 16/010,863

(22) Filed: Jun. 18, 2018

(65) Prior Publication Data

US 2019/0387138 A1    Dec. 19, 2019

(51) Int. Cl.
   *H04N 5/225* (2006.01)
   *G03B 17/02* (2006.01)
   *H04N 13/239* (2018.01)

(52) U.S. Cl.
   CPC .......... *H04N 5/2253* (2013.01); *G03B 17/02* (2013.01); *H04N 13/239* (2018.05); *H04N 5/2254* (2013.01); *H04N 2213/001* (2013.01)

(58) Field of Classification Search
   CPC .. H04N 5/2253; H04N 13/239; H04N 5/2254; H04N 2213/001; G03B 17/02
   See application file for complete search history.

(56) References Cited

U.S. PATENT DOCUMENTS

| | | | |
|---|---|---|---|
| 8,081,207 B2 * | 12/2011 | Barman | H04N 5/2252 348/47 |
| 2008/0173792 A1 * | 7/2008 | Yang | H01L 27/14618 250/208.1 |
| 2018/0042106 A1 * | 2/2018 | Scheja | H04N 5/2253 |

* cited by examiner

*Primary Examiner* — Christopher Braniff
(74) *Attorney, Agent, or Firm* — Arent Fox LLP

(57) ABSTRACT

An image capture device in accordance with the present disclosure includes a cover coupled to a mount to surround a stereoscopic-camera unit. The stereoscopic-camera unit includes a circuit board coupled to a frame having a top brace, a bottom brace, and lens holders. The top brace and bottom brace each are formed a similar material as the circuit board (e.g., a FR4 material), such that the top and bottom braces share a similar coefficient of expansion with the circuit board.

12 Claims, 4 Drawing Sheets

OPTICAL LENS SUPPORT

BACKGROUND

The present disclosure relates to an image capture device, and particularly to a stereoscopic camera. More particularly, the present disclosure relates to a stereoscopic-camera unit having a circuit board supported by a frame formed by a similar material of the circuit board.

SUMMARY

An image capture device in accordance with the present disclosure includes a cover coupled to a mount to surround a stereoscopic-camera unit. The stereoscopic-camera unit includes a circuit board coupled to a frame having a top brace, a bottom brace, and lens holders. Image sensors are positioned and aligned on the circuit board. In illustrative embodiments, the circuit board is formed of a first material having a given coefficient of thermal expansion. The top brace and the bottom brace are formed a second material having a substantially similar coefficient of expansion.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
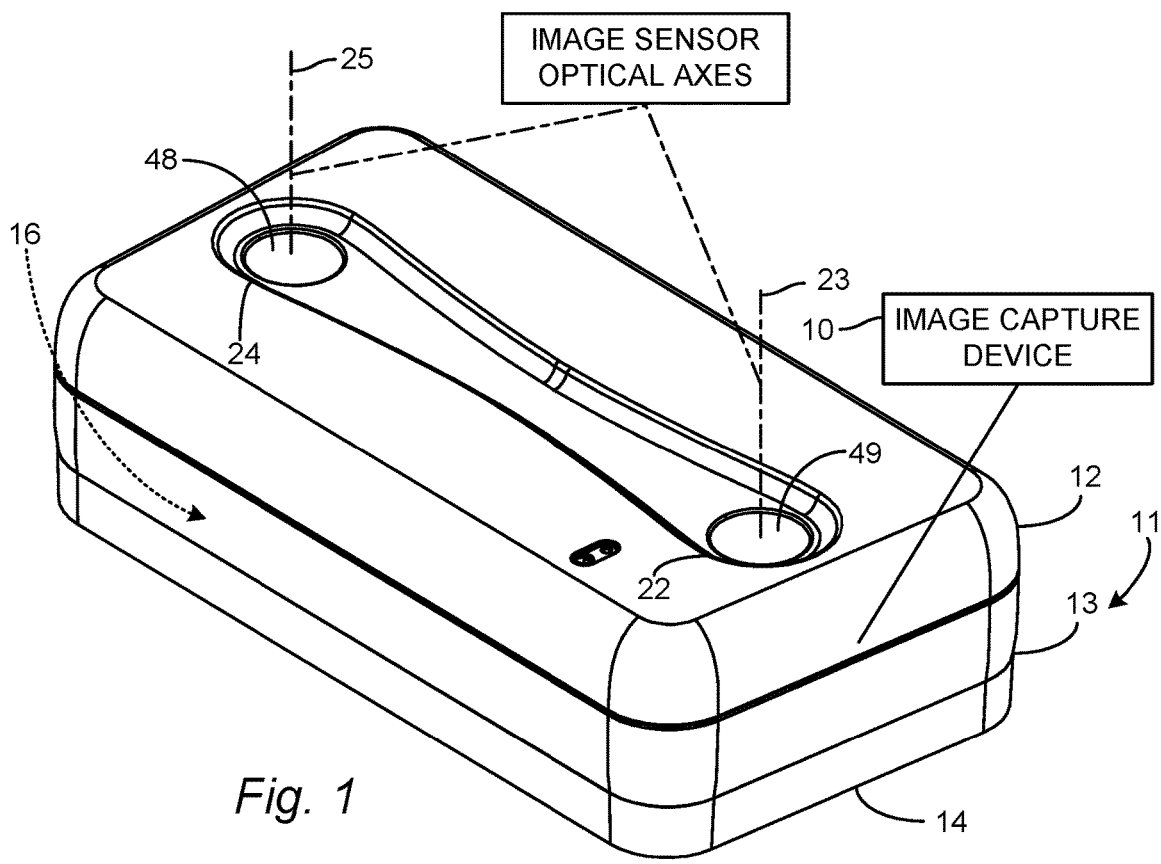
FIG. 1 is a perspective view of an image capture device in accordance with the present disclosure showing that the image capture device includes a pair of image sensors having optical axes that are spaced apart and aligned in a common direction.

An image capture device 10 in accordance with the present disclosure is shown in FIG. 1. Image capture device 10 includes a case 11 having a cover plate 12 and a back plate 13. The cover plate 12 is coupled to a mount plate 14 to surround a stereoscopic-camera unit 16. Image sensors 22, 24 of stereoscopic-camera unit 16 have optical axes 23, 25 that are spaced apart and aligned in a common direction. Image capture unit 10 is configured to capture images using image sensors 22, 24, in which the images may be processed to produce relative height measurements for distinguishing potential customers in a retail setting, for example. Windows 48, 49 of the cover plate 12 may be aligned over the image sensors 22, 24.

Figure 2:
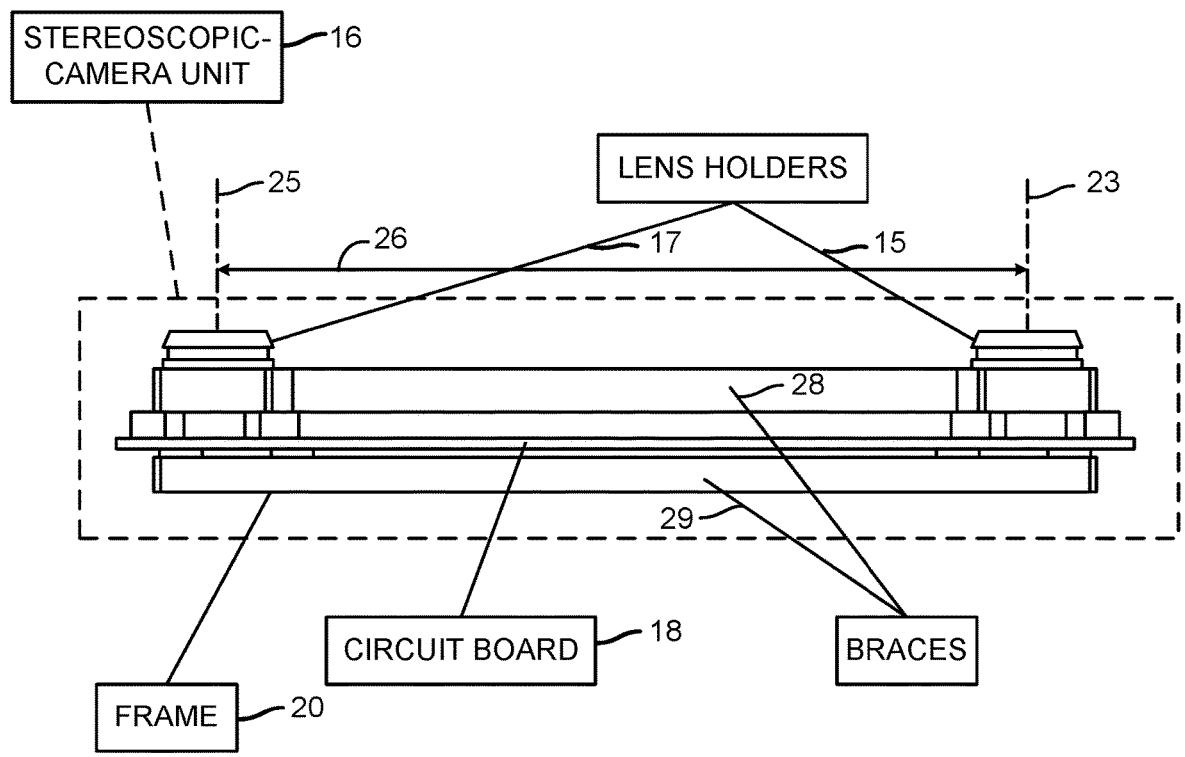
FIG. 2 is a side elevation view of a stereoscopic-camera unit in accordance with the present disclosure showing a circuit board of the stereoscopic-camera unit being supported by a frame formed around the circuit board to resist bending thereof, the frame including lens holders and a top and bottom brace, each brace formed of a similar material to that of the circuit board.

Stereoscopic-camera unit 16 includes a circuit board 18 coupled to a frame 20 as shown in FIG. 2. The image sensors 22, 24 may be positioned on the circuit board 18 in a given alignment. Circuit board 18 includes a frame 20. The frame 20 includes lens holders 15, 17 that are two outer fixed rigid sections that move with the frame 20. The frame 20 also includes braces 28, 29. Image sensors 22, 24 are in alignment with the lens holders 15, 17, respectively. Optical axes 23, 25 are spaced apart by a distance 26.

The circuit board 18 itself may be thin and subject to bending, expansion, or contraction, etc., when exposed to temperature variation. The frame 20 is formed around the circuit board 18 to resist bending. Expansion and contraction of the circuit board 18 relative to the frame 20 may result in misalignment of the image sensors if the frame 20 does not expand or contract at substantially the same rate as the circuit board 18. For instance, assume the braces 28, 29 are formed of a given material, such as some metals having a differing coefficient of thermal expansion from a material used to form the circuit board 18. As a result, temperature variations and the like could cause bending or other stresses on the circuit board 18 due to the braces 28, 29 expanding or contracting at a different rate. Consequently, the image sensors may misalign.

To address this concern, in the illustrative embodiment, the braces 28, 29 are formed with a material that has a substantially similar coefficient of thermal expansion as material forming the circuit board 18. As a result, the frame 20 may expand at substantially the same rate as the circuit board 20, e.g., when exposed to certain temperatures. In some embodiments, the braces 28, 29 may be made of a FR-4 material.

Figure 3:
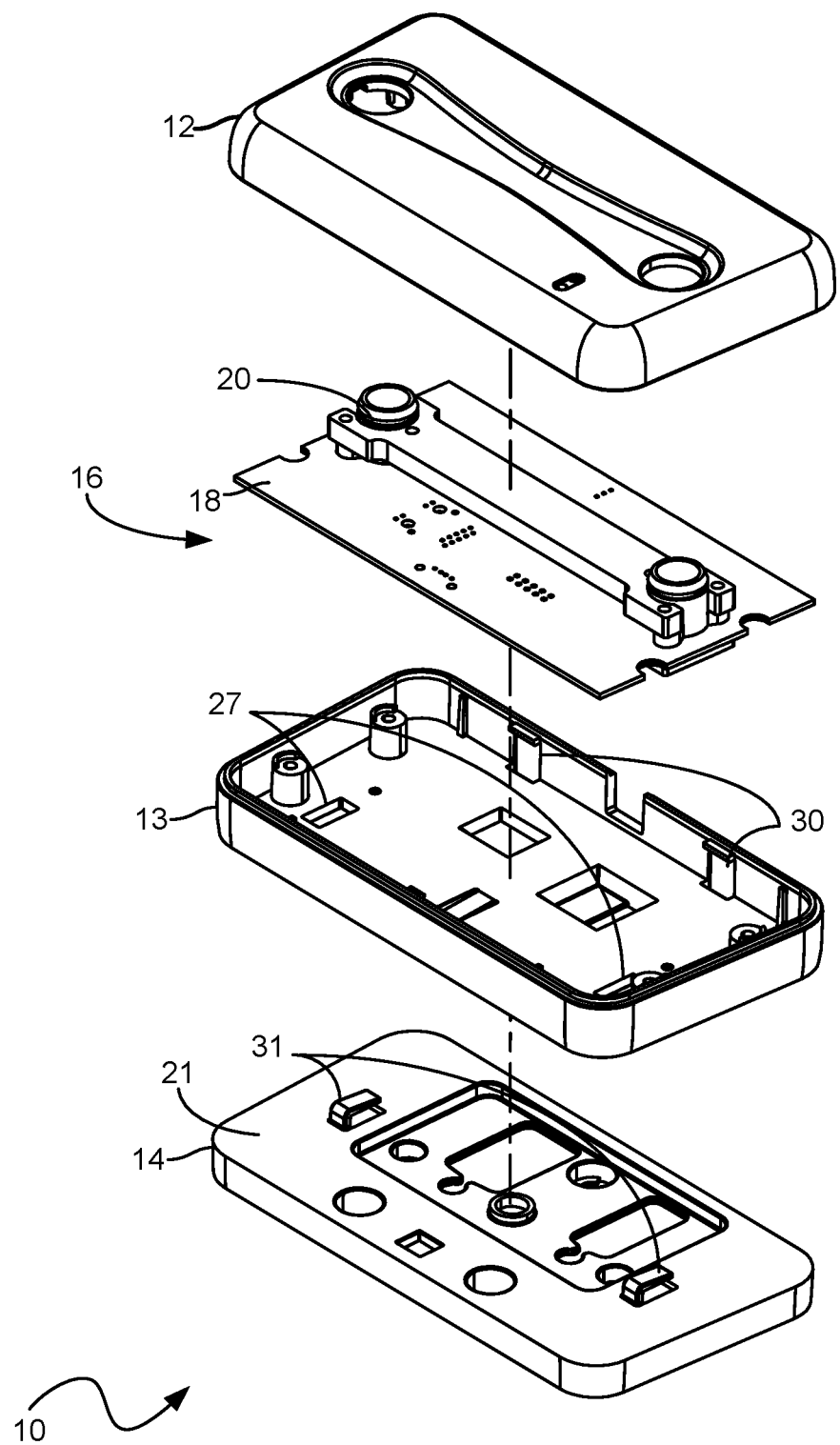
FIG. 3 is an upper perspective exploded assembly view of the image capture device of FIG. 1 showing that a cover of the image capture device is arranged to couple with a mount of the image capture device to surround the stereoscopic-camera unit.

FIG. 3 illustrates an exploded assembly view of the image capture device 10. In particular, FIG. 3 separately depicts each of the cover plate 12, the stereoscopic-camera unit 16, the back plate 13, and the mount 14. Mount 14 includes a base 31 and hooks 31. The back plate 13 includes slots 27 to couple with the mount 14 by engaging with the hooks 31. The back plate 13 also includes tabs 30 to hold the circuit board 18 in place relative to the case 11. The base 31 is configured to attach image capture device 10 to a structure, such as a wall or ceiling of a building for example, using fasteners or other securing means.

Figure 4:
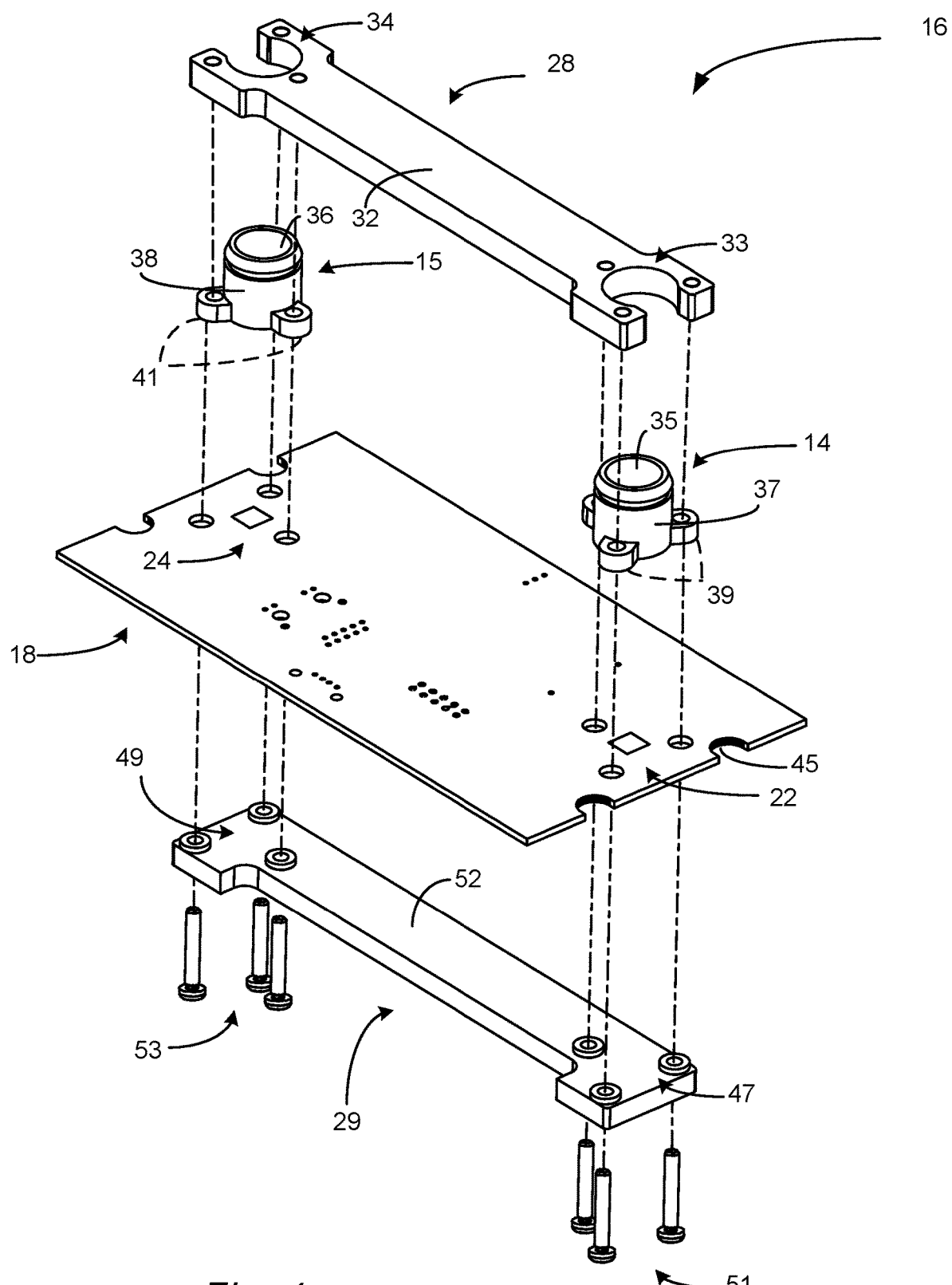
FIG. 4 is an upper perspective exploded assembly view of the stereoscopic-camera unit of FIG. 1 displayed to suggest that the top and bottom braces of the frame sandwich the lens holders above and below the circuit board to maintain alignment of the image sensors.

FIG. 4 illustrates an exploded assembly view of the stereoscopic-camera unit 16. Illustratively, the top brace 28 is formed of a beam 32 having a substantially solid cross section thereacross. The top brace 28 includes grips 33, 34 at opposing ends thereof. Each grip 33, 34 is formed to define a recess. In some embodiments, grips are separate and fastened to the beam 32. The recess allows the each grip 33, 34 engage with fasteners (e.g., fasteners 51, 53). The lens holders 15, 17 each include lens 35, 36, respectively, which may serve as lenses for the image sensors 22, 24. Caps of the lens holder 15, 17 may be aligned with the windows 48, 49 of cover 12 such that image sensors 22, 24 align with windows 48, 49 as suggested in FIGS. 1 and 4. Further, the lens holders 15, 17 also include a barrel 37, 38, respectively. Further still, the lens holders 15, 17 include feet 39, 41 extending out from the barrels 37, 38, respectively. The grips 33, 34 are to engage with the barrels 37, 38, respectively. The feet 39, 41 are formed to receive fasteners 51, 53, respectively.

The circuit board 18 further includes image sensors 22 and 42 positioned thereon. The lens holders 14 and 15 are positioned over the image sensors 22, 24. Each of the image sensors 22, 24 are surrounded by holes in the circuit board 18 through which fasteners 51 and 52 extend. The circuit board 18 also includes a pair of notches 45 on each end thereof.

The bottom brace 29 is formed of a beam 52 having a substantially solid cross section thereacross. The bottom brace 29 also includes receivers 47, 49, through which the fasteners 51, 53 extend, respectively. The fasteners 51, 53 extend through the receivers 47, 49, circuit board 18, lens holders 15, 17, and grips 33, 34, e.g., in the manner suggested by FIG. 4, to sandwich the circuit board 18 between the top brace 28 and bottom brace 29. As a result, the braces 28, 29 support the circuit board 18. In some embodiments, fasteners 51, 53 engage with the braces 28, 29 to hold the frame 20 on mount 14. As a result, frame 20 provides stability and maintains alignment of optical axes 23, 25.

Figure 5:
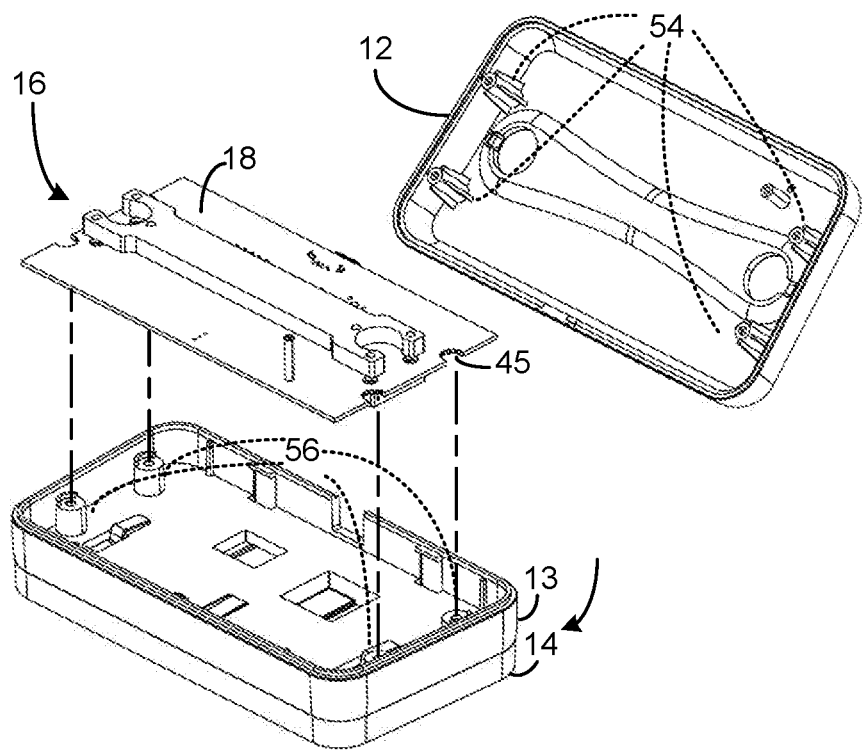
FIG. 5 is a perspective and exploded view of the image capture device of FIG. 1 with the cover plate removed and showing that the circuit board and frame are fastened to stands of the mount plate through notches on the circuit board to allow expansion and contraction of the braces in the frame.
Figure 6:
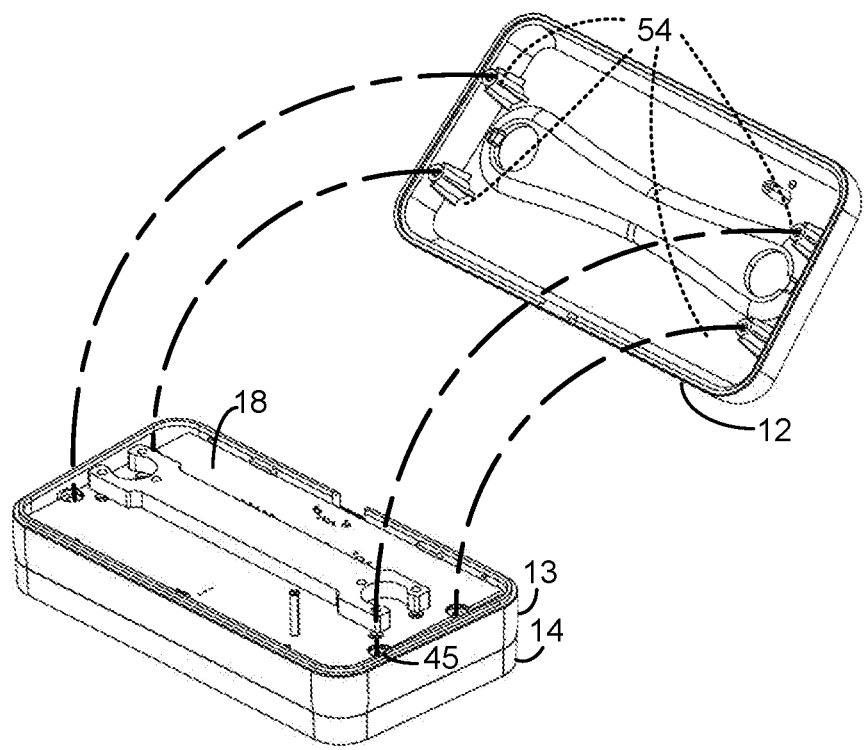
FIG. 6 is a perspective and exploded view of the image capture device of FIG. 1 to show the cover plate is fastened to the circuit board to posts of the cover plate through notches on the circuit board to allow expansion and contraction of the braces in the frame.

FIGS. 5 and 6 illustrate perspective views of the image capture device 10 to suggest the placement of the stereoscopic-camera unit 16 within the case 11. Illustratively, FIG. 5 depicts the back place 13 engaged with the mount plate 14 by fitting the hooks 31 through the slots 27. FIG. 5 shows a view of the bottom side of the cover plate 12. As shown, the cover plate 12 includes two pairs of posts 12, each pair on opposing sides of one another. The back plate 13 includes two pairs of stands 56, each pair on opposing sides of one another. FIG. 5 suggests that the circuit board 18 engages with the stands 56 at each of the respective notches 45.

FIG. 6 shows the circuit board 18 engaged with the back plate 13 by way of the stands 56 at each of the respective notches 45. FIG. 6 also depicts a mounting of the cover 12 to the back plate 13 and mount plate 14. Illustratively, FIG. 6 suggests that the posts 54 extend through the respective notches 45 of the circuit board 18. In effect, the circuit board 18 engages with the posts 54 and the stands 56 through the notices 45, such that the circuit board 18 is trapped between the posts 54 and the stands 56, limiting movement of the circuit board 18 to the x- and y direction and limiting movement in the z-direction without completely fixing the circuit board 18. The notches 45 and case 11 provide some clearance to allow expansion and contraction within the plane of the circuit board 18. The plates of the case 11 may be secured together, e.g., using fasteners.

A connector (not shown) engages with circuit board 18 to transmit images captured by image sensors 22, 24 to a location remote from image capture device 10 for storage or other processing. In some embodiments, a wireless transmitter may be used in place of or in combination with the connector. Image capture device 10 can be powered through the connector or another other power source, such as one or more batteries or a separate power adapter.

In some embodiments, frame 20 is formed from a material (e.g., FR4 material) that has a similar coefficient of thermal expansion from circuit board 18, which allows the frame 20 to expand and contract at relatively the same rate as the circuit board 18. In doing so, frame 20 provides stability and maintains alignment of optical axis 23, 25 and minimizes or eliminates negative effects of relative thermal expansion between frame 20 and circuit board 18. For example, a circuit board having a different coefficient of thermal expansion from the braces 28, 29 of the frame 20 can force the circuit board to expand beyond a threshold of elastic deformation from increases in temperature and in some instances can cause permanent elongation of the circuit board with repeated expansion and contraction cycles during variations in temperature. Deformation of the circuit board can cause misalignment of the optical axis of the image sensors and negatively affect the accuracy of images captured by the image sensors. Using braces 28, 29 having a similar coefficient of thermal expansion allow expansion and contraction of circuit board 18 while minimizing or eliminating the effect of expansion and contraction of the circuit board 18 on the alignment of the image sensors 22, 24.

In illustrative embodiments, image capture unit 10 can be electronically or wirelessly linked to a counting system for monitoring consumer traffic patterns at facilities such as malls or stores. Image capture unit 10 is mounted above an entrance or entrances to a facility for capturing images from the entrance or entrances. The area captured by the image capture unit 10 is a field of view, and images captured by image capture unit 10 are transmitted to the counting system with the time when the image is captured.

The spaced apart image sensors 22, 24 allow image capture unit 10 to simulate human binocular vision. A pair of stereo images includes an image taken by each image sensor 22, 24, and a height map is constructed from the pair of stereo images through computations involving finding corresponding pixels. Object detection is a process of locating candidate objects in the height map. Because human objects of interest are much higher than the ground, local maxima of the height map often represent heads of human objects and can be used for counting human traffic. Further discussion on capturing and counting traffic data can be found, for example, in U.S. Pat. No. 8,472,672, which is expressly incorporate by reference herein.

In illustrative embodiments, the fixed sections move with the frame to maintain an optical center during fluctuations in temperature. The frame may be mounted on posts of a mount that fit inside holes of the floating central board with adequate clearance so the floating board does not touch the posts.

The invention claimed is:

1. A stereoscopic-camera unit comprising:
a circuit board having at least a first image sensor and a second image sensor positioned thereon, the circuit board being formed of a first material; and
a frame having a top brace, a bottom brace, and at least a first lens holder and a second lens holder, the top and bottom braces being formed of a second material having a substantially similar coefficient of expansion as the circuit board and the top brace including a first beam engaged with the first lens holder and the second lens holder, the first beam having grips on opposing ends thereof, each grip defining a recess along the respective opposing end of the top brace,
wherein the frame is to support an alignment of the first lens holder over the first image sensor and the second lens holder over the second image sensor over the second lens holder on the circuit board.

2. The stereoscopic-camera unit of claim 1, wherein a first grip of the grips engages with the first lens holder and a second grip of the grips engages with the second lens holder.

3. The stereoscopic-camera unit of claim 1, wherein the bottom brace includes a second beam having receivers on opposing ends thereof.

4. The stereoscopic-camera unit of claim 3, wherein the grips sandwich the circuit board between the top and bottom braces, and further comprising fasteners to extend through the receivers and grips to sandwich the circuit board between the top and bottom braces.

5. The stereoscopic-camera unit of claim 1, wherein the top and bottom braces each have a substantially solid cross-section thereacross.

6. The stereoscopic-camera unit of claim 1, wherein the first and second materials are a FR4 material.

7. An image capture device comprising:
a cover having windows extending therethrough;
a mount having a base; and
a stereoscopic-camera unit comprising:
  a circuit board having at least a first image sensor and a second image sensor positioned thereon, the circuit board being formed of a first material, and
  a frame having a top brace, a bottom brace, and at least a first lens holder and a second lens holder, the top and bottom braces being formed of a second material having a substantially similar coefficient of expansion as the circuit board and the top brace including a first beam engaged with the first lens holder and the second lens holder, the first beam having grips on opposing ends thereof, each grip defining a recess along the respective opposing end of the top brace,
wherein the circuit board engages with the cover and the mount and wherein the frame is to support an alignment of the first lens holder over the first image sensor and the second lens holder over the second image sensor over the second lens holder image sensors positioned on the circuit board.

8. The image capture device of claim 7, wherein a first grip of the grips engages with the first lens holder and a second grip of the grips engages with the second lens holder.

9. The image capture device of claim 7, wherein the bottom brace includes a second beam having receivers on opposing ends thereof.

10. The image capture device of claim 9, wherein grips to sandwich the circuit board between the top and bottom braces and the stereoscopic-camera comprises fasteners to extend through the receivers.

11. The image capture device of claim 9, wherein the top and bottom braces each have a substantially solid cross-section thereacross.

12. The image capture device of claim 9, wherein the first and second materials are a FR4 material.

\* \* \* \* \*

UNITED STATES PATENT AND TRADEMARK OFFICE
CERTIFICATE OF CORRECTION

PATENT NO. : 10,958,812 B2
APPLICATION NO. : 16/010863
DATED : March 23, 2021
INVENTOR(S) : Jeffrey R. Rendlen It is certified that error appears in the above-identified patent and that said Letters Patent is hereby corrected as shown below:

In the Drawings

In Fig. 5, Sheet 4 of 4, delete "Fig 5" and insert -- Fig. 5 --, therefor.

In the Specification

In Column 2, Lines 40-41, delete "circuit board 20," and insert -- circuit board 18, --, therefor.

In Column 3, Line 8, delete "14 and 15" and insert -- 15 and 17 --, therefor.

In the Claims

In Column 6, Lines 7-8, in Claim 7, delete "holder image sensors positioned" and insert -- holder --, therefor.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*